(12) United States Patent
Hilker

(10) Patent No.: US 10,861,656 B2
(45) Date of Patent: Dec. 8, 2020

(54) SPRING-LOADED DRIVE FOR A HIGH-VOLTAGE POWER SWITCH AND METHOD FOR OPERATING THE SPRING-LOADED DRIVE

(71) Applicant: SIEMENS AKTIENGESELLSCHAFT, Munich (DE)

(72) Inventor: Thomas Hilker, Stahnsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 45 days.

(21) Appl. No.: 16/310,048

(22) PCT Filed: May 16, 2017

(86) PCT No.: PCT/EP2017/061685
§ 371 (c)(1),
(2) Date: Dec. 14, 2018

(87) PCT Pub. No.: WO2017/215865
PCT Pub. Date: Dec. 21, 2017

(65) Prior Publication Data
US 2019/0333719 A1 Oct. 31, 2019

(30) Foreign Application Priority Data
Jun. 14, 2016 (DE) .......... 10 2016 210 466

(51) Int. Cl.
*H02M 7/217* (2006.01)
*H01H 3/26* (2006.01)

(52) U.S. Cl.
CPC .............. *H01H 3/26* (2013.01); *H02M 7/217* (2013.01); *H01H 2003/266* (2013.01)

(58) Field of Classification Search
CPC .................. H02P 3/04; H02M 7/217
See application file for complete search history.

(56) References Cited

U.S. PATENT DOCUMENTS

| 3,575,527 | A | * | 4/1971 | Watanabe | ............ F04D 25/08 |
| | | | | | 416/32 |
| 3,794,893 | A | * | 2/1974 | Arpino | ............ H02M 7/217 |
| | | | | | 318/400.3 |
| 4,205,783 | A | * | 6/1980 | Dietsche | ............ F23L 11/005 |
| | | | | | 126/285 B |
| 6,452,350 | B1 | * | 9/2002 | Finkemeyer | ............ H02P 3/04 |
| | | | | | 192/125 A |
| 2002/0121503 | A1 | * | 9/2002 | Spiegel | ............ H01H 3/30 |
| | | | | | 218/154 |

(Continued)

FOREIGN PATENT DOCUMENTS

| CN | 105513913 A | 4/2016 |
| DE | 2412484 A1 | 9/1974 |

(Continued)

*Primary Examiner* — Rina I Duda
(74) *Attorney, Agent, or Firm* — Laurence Greenberg; Werner Stemer; Ralph Locher

(57) ABSTRACT

A spring-loaded drive for a high-voltage power switch contains at least one spring and at least one tensioning motor for the at least one spring. The spring-loaded drive contains at least one rectifier circuit, which is formed by a plurality of diodes where precisely one diode is connected in series to the tensioning motor.

10 Claims, 4 Drawing Sheets

(56) References Cited

U.S. PATENT DOCUMENTS

2015/0211750 A1\* 7/2015 Klemm ............... F24C 15/2092
126/299 D

FOREIGN PATENT DOCUMENTS

| EP | 0506220 A2 | 9/1992 |
| EP | 0720193 A1 | 7/1996 |
| FR | 2873850 A1 | 2/2006 |
| GB | 2185631 A | 7/1987 |

\* cited by examiner

SPRING-LOADED DRIVE FOR A HIGH-VOLTAGE POWER SWITCH AND METHOD FOR OPERATING THE SPRING-LOADED DRIVE

BACKGROUND OF THE INVENTION

Field of the Invention

The invention relates to a spring-loaded drive for a high-voltage power switch, and also to a method for operating the spring-loaded drive, wherein the spring-loaded drive comprises at least one spring and at least one tensioning motor for the at least one spring.

Power switches close and open current paths of high electrical voltages and currents, in particular in the region of up to a few 10,000 V and of up to a few 1,000 A. A large amount of mechanical energy is required for this purpose. Spring-loaded drives are used for providing the required mechanical energy. In these drives, a mechanical spring is tensioned using a motor by means of a gear mechanism until the spring is mechanically latched. The spring is locked against relaxing autonomously, and therefore the energy is stored in the spring. The locking arrangement can be released by a tripping device, wherein the spring relaxes and the stored kinetic energy is released for a switching action of the power switch.

The types of motor which are used for tensioning springs differ in respect of design and technical properties. Series-wound or universal motors are suitable for use with DC voltage and AC voltage. Therefore, one motor can be employed for a specific DC voltage value and also for an AC voltage of double the amplitude. In switchgear assemblies, this property is used, for example, in order to employ one and the same motor for mains operation at 220 V AC and, alternatively, for battery operation at 110 V DC.

Series-wound or universal motors are not suitable for any desired drive configurations owing to their rotation speed/torque characteristic. Therefore, shunt-wound motors are also employed for tensioning spring energy stores or springs, the rotation speed of said shunt-wound motors being less influenced by the torque than in the case of series-wound motors. However, shunt-wound motors are DC machines and therefore do not exhibit the advantage of the above-described flexibility in respect of the supply voltage form.

To date, different embodiments of DC motors have been used for different voltages and voltage forms. The configuration of the windings varies depending on the rated voltage. In addition, motors with additional rectifiers are used for AC voltage operation, said additional rectifiers not being necessary for DC voltage operation.

The rectifiers used can be bridge rectifiers which are integrated, in particular, into the electrical motor circuit for AC voltage operation. A two-pulse bridge rectifier, realized in the form of a Graetz circuit, converts the AC voltage into a pulsating DC voltage by way of each negative half-wave of the AC voltage being shifted to the positive voltage region. This produces a DC voltage equivalent which drives the motor. In this case, at least two motor variants are required. One variant for the DC voltage supply and a further variant for the AC voltage supply which is twice as high. If a distinction were not made between these motor variants, four times the power would be implemented in the motor, which is designed for DC voltage operation, during operation using a rectified AC voltage of double the magnitude. The motor can be damaged in this way.

SUMMARY OF THE INVENTION

The object of the present invention is to avoid or reduce the above-described problems. In particular, the object is to provide a spring-loaded drive for a high-voltage power switch and a method for operating the spring-loaded drive, which spring-loaded drive and method allow the use of one and the same motor, in particular shunt-wound motor, for tensioning a spring of the spring-loaded drive in the case of AC voltage and in the case of DC voltage. In particular, the objective is to be able to operate the tensioning motor at an AC voltage which is double the magnitude of the DC voltage and at DC voltage, without damaging the motor. The objective is for different spring drives to be operated in the case of DC voltage and AC voltage with one motor variant in order to save costs and to allow simple construction.

According to the invention, the specified object is achieved by a spring-loaded drive for a high-voltage power switch having the features as claimed in the independent apparatus patent claim and/or by a method for operating the spring-loaded drive, in particular using the above-described spring-loaded drive, as claimed in the independent method patent claim. Advantageous refinements of the spring-loaded drive according to the invention for a high-voltage power switch and/or of the method for operating the spring-loaded drive are specified in the dependent claims. In this case, the subjects of the main claims can be combined with one another and with features of dependent claims, and features of the dependent claims can be combined with one another.

A spring-loaded drive according to the invention for a high-voltage power switch comprises at least one spring and at least one tensioning motor for the at least one spring. At least one rectifier circuit is included in the spring-loaded drive, which rectifier circuit is formed by precisely one diode which is connected in series with the tensioning motor.

Owing to the rectifier circuit with precisely one diode which is connected in series with the tensioning motor, only a half-wave of the voltage is supplied to the tensioning motor when an AC voltage is applied to the circuit. The other half-wave is suppressed. In the case of an AC voltage of, for example, 220 V AC, double the power is made available to the tensioning motor in comparison to a DC voltage of 110 V DC which is only half the magnitude. When a two-pulse bridge rectifier, in particular with a Graetz circuit comprising four diodes, is used, in comparison to the circuit according to the invention with only one diode which is connected in series with the tensioning motor, four times the power is made available to the tensioning motor in the case of AC voltage compared with the half DC voltage. The tensioning motor can be damaged in this way. It is necessary to use different motor variants in the case of AC voltage and DC voltage.

In the case of the spring-loaded drive according to the invention comprising only one diode which is connected in series with the tensioning motor, only double the power is made available to the tensioning motor in the case of an AC voltage compared with the half DC voltage. Damage to the tensioning motor is avoided in this way and one and the same tensioning motor, in particular shunt-wound motor, can be used in the case of AC voltage and in the case of DC voltage, in particular in the case of the half DC voltage compared with the AC voltage.

The reduction in the different tensioning motor variants required saves costs and simplifies the construction of the spring-loaded drive for high-voltage power switches. A standardized tensioning motor can be used for different power switch variants and spring-loaded drive variants.

The diode of the spring-loaded drive can be a semiconductor diode. Semiconductor diodes are cost-effective, powerful and readily available for different power requirements.

The tensioning motor can comprise a housing, in particular a metal housing, and the diode can be in thermal contact with the housing, in particular for the purpose of cooling the diode by means of the housing. As a result, good heat dissipation from the diode to the surrounding area can be achieved. Good cooling, in particular by means of the large motor housing, for example composed of metal with good thermal conductivity, can prevent destruction of the diode. As a result, the spring-loaded drive is more reliable, requires less maintenance, this saving costs amongst other things, and an additional cooling device for the diode can be saved.

The diode can be arranged in the housing, in particular directly thermally conductively fastened to the housing. The diode can be integrated in the electrical circuit of the motor voltage supply. As a result, a space-saving, compact design of the spring-loaded drive having the above-described advantages is possible.

The diode can be included in a bridge rectifier, in particular in the form of a Graetz circuit, wherein precisely one diode of the bridge rectifier is connected electrically in series with the tensioning motor, in particular in such a way that, in the case of AC voltage, a half-wave of the AC voltage is applied to the tensioning motor by means of the diode in the forward direction and the tensioning motor can be driven by the half-wave, and wherein, in particular, three diodes of the bridge rectifier are each connected in series with one another, in parallel with the one diode in series with the tensioning motor, and the three diodes are interconnected in such a way that no current flows across the three diodes.

As a result, a standard motor with a bridge rectifier can be used and, by different wiring, can be operated with half the power loss in the case of double the AC voltage compared with the DC voltage according to the invention. The new wiring reduces the risk of the motor being destroyed. In this case, existing high-voltage power switches can be converted by simply changing the circuitry. Three diodes are connected in parallel with a diode which is connected in series with the motor and block the current flow across the parallel branch comprising the three diodes in both directions of current flow. A current can flow to the motor only across the circuit branch comprising one diode, as a result of which the circuit according to the invention comprising an existing bridge rectifier circuit and, respectively, the spring-loaded drive according to the invention are realized with a simple means.

The one diode can be formed from diode elements, connected in series and/or in parallel with one another, with the same forward direction. The same effect can be achieved with one diode or two diodes or more diodes which produce the properties of the one diode. Therefore, for example, two diodes which are connected in series, across each of which half the voltage of the one diode is dropped and which have the same forward direction, can produce the one diode or the same electrical effect as the one diode. Analogously, for example, two diodes which are connected in parallel, across each of which half the current of the one diode flows, wherein the two diodes have the same forward direction toward the motor, can produce the one diode or the same electrical effect as the one diode.

The spring-loaded drive can comprise precisely one tensioning motor, in particular a tensioning motor for DC voltage and AC voltage and/or a shunt-wound motor. The above-described advantages, in particular the saving of costs, are achieved in this way.

A method according to the invention for operating a spring-loaded drive, in particular an above-described spring-loaded drive, comprises the following steps. At least one spring is tensioned by at least one tensioning motor for the purpose of driving a high-voltage power switch, wherein the at least one tensioning motor is supplied with voltage by means of a circuit which comprises precisely one diode in series with the tensioning motor with a forward direction which has the effect that, in the case of AC voltage, a half-wave of the voltage is supplied to the tensioning motor for the purpose of driving the tensioning motor and the current flow across the tensioning motor is blocked in the region of the other half-wave.

Precisely one tensioning motor can be used for the purpose of tensioning the at least one spring, which tensioning motor is operated with DC voltage and AC voltage, in particular in the case of an AC voltage which is double the magnitude of the DC voltage with double the power compared to the power in the case of DC voltage.

The advantages of the method according to the invention for operating a spring-loaded drive as claimed in the independent method claim are analogous to the above-described advantages of the spring-loaded drive for a high-voltage power switch as claimed in the independent apparatus claim, and vice versa.

Exemplary embodiments of the invention are schematically illustrated in FIGS. 1 to 7 and described in more detail below.

DESCRIPTION OF THE INVENTION

Figure 1:
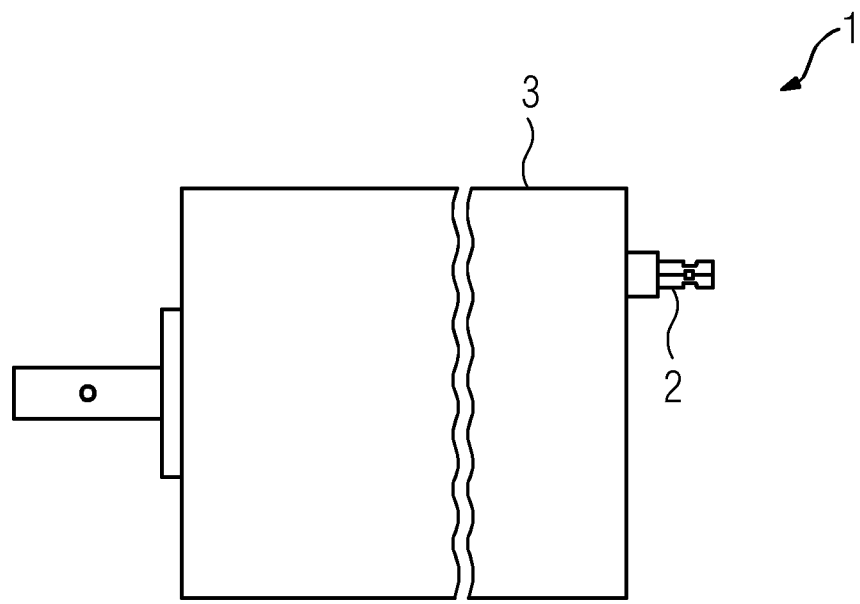
FIG. 1 schematically shows a side view of a tensioning motor 1 for a spring of a spring-loaded drive for a high-voltage power switch.

FIG. 1 schematically shows a side view of a tensioning motor 1 for a spring of a spring-loaded drive for a high-voltage power switch. For the sake of simplicity, elements such as the spring of the spring energy store, gear mechanism and further elements of the kinematic chain of the high-voltage power switch are not illustrated in the figures. The tensioning motor 1 shown comprises a housing 3 and electrical contacts 2 for electrically connecting the tensioning motor 1 to an electrical power supply. The power supply can make available DC voltage or AC voltage in order to drive the tensioning motor. For example, AC voltage of 220

V AC or DC voltage of 110 V DC can be applied to the contacts 2 of the tensioning motor 1.

Figure 2:
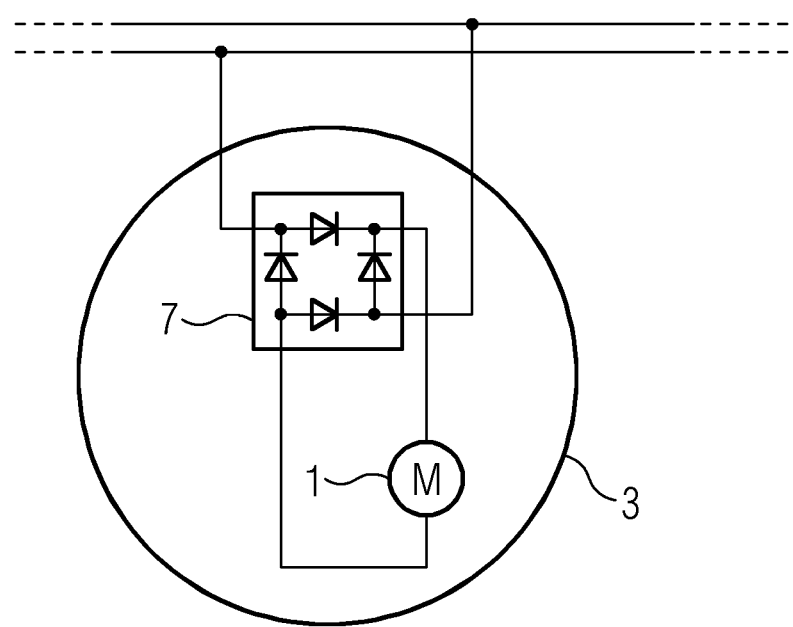
FIG. 2 shows a tensioning motor 1 comprising 4 diodes according to the prior art connected into a bridge rectifier circuit 7.

FIG. 2 shows a tensioning motor 1 according to the prior art comprising 4 diodes connected into a bridge rectifier circuit 7. The diodes are interconnected in such a way that a positive voltage is always applied to the motor 1. This is necessary so that the motor 1 always moves in the same direction of rotation and tensions the springs. When DC voltage is applied, the DC voltage is applied or passed on to the motor 1 in unchanged form by the bridge rectifier circuit 7. In the case of AC voltage, the negative half-wave of the AC voltage is in each case folded or converted into the positive region, so that the positive half-wave of the AC voltage and the half-wave of the AC voltage which is folded into the positive region are applied to the motor 1.

When one type of motor or motor 1 is used for DC voltage and AC voltage, for example for tensioning the spring with AC voltage from the mains of 220 V AC and, in the event of a power cut, with 110 V DC from batteries or another emergency power supply, a positive voltage is always applied to the motor 1, which positive voltage leads to a fixed direction of rotation for tightening/tensioning the spring or springs. In the case of mains operation at 220 V AC, the bridge rectifier circuit 7 leads to a high residual ripple of the voltage or of the current, with 4 times the power at the motor 1 compared to DC voltage of 110 V DC at the motor 1 in the case of, for example, emergency power supply. The high power at the motor 1 can lead to damage or makes it necessary for the motor 1 to be designed for high powers, this leading to high costs and, under certain circumstances, making it necessary to use different motors in the case of DC voltage and AC voltage.

Figure 3:
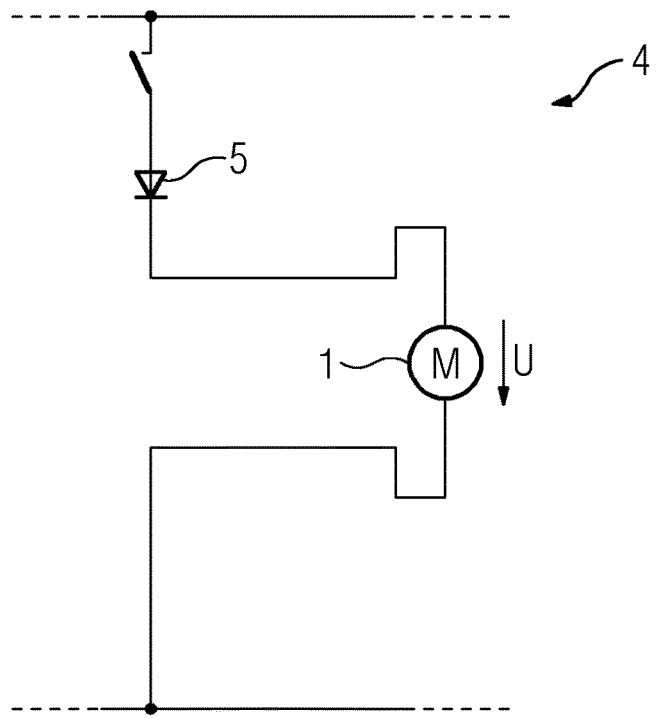
FIG. 3 shows a rectifier circuit 4 of a spring-loaded drive according to the invention for a high-voltage power switch comprising only one diode 5.
Figure 4:
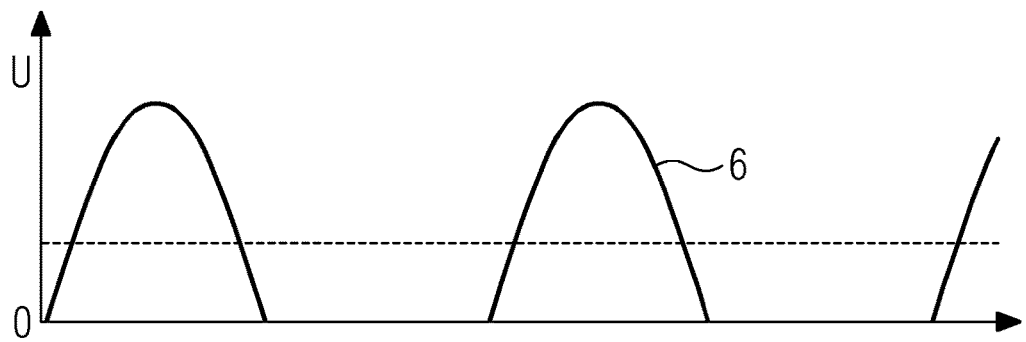
FIG. 4 shows the voltage curve of the rectifier circuit 4 of FIG. 3 in the case of AC voltage with a half-wave.

FIG. 3 shows a rectifier circuit 4 of a spring-loaded drive according to the invention for a high-voltage power switch comprising only one diode 5. The diode 5 is connected in series 4 with the tensioning motor 1. The diode 5 used can be, for example, a semiconductor diode, in particular a semiconductor power diode. The series circuit 4 of the diode 5 to the tensioning motor 1 leads to a voltage curve 6, as is illustrated in FIG. 4. The negative half-wave in the case of AC voltage is not passed by the diode and only the positive half-wave of the AC voltage is applied to the tensioning motor 1 and is used for tensioning the spring. In the case of DC voltage, the entire voltage, assuming the correct polarity of the voltage, is applied to the motor 1 and the current is passed by the diode 5. The entire DC voltage can be used by the motor 1 for the purpose of tensioning the spring.

The series circuit 4 of the diode 5 with the tensioning motor 1 leads, for example, to double the power at the motor 1 at an AC voltage of 220 V AC compared to a DC voltage of 110 V DC at the motor 1 in the case of, for example, emergency power supply. The motor is subjected to less loading than with 4 times the power in the case of a bridge rectifier circuit 7 and the residual ripple of the voltage is lower. A positive voltage is applied to the motor 1 both in the case of DC voltage and AC voltage since, in the case of AC voltage, the negative half-wave of the voltage is blocked or not passed, that is to say is filtered out, by the diode 5. The motor 1 always rotates in the same direction for the purpose of tensioning the spring or springs. Owing to the lower power converted at the motor 1 in the case of AC voltage compared to bridge rectifier circuit 7, one and the same motor 1 or type of motor can be used in the case of DC voltage and AC voltage, and/or the motor 1 can be designed in a simpler and more cost-effective manner. In particular, different spring-loaded drives with different requirements can be operated by one and the same type of motor, wherein the standardization leads to cost savings.

Figure 5:
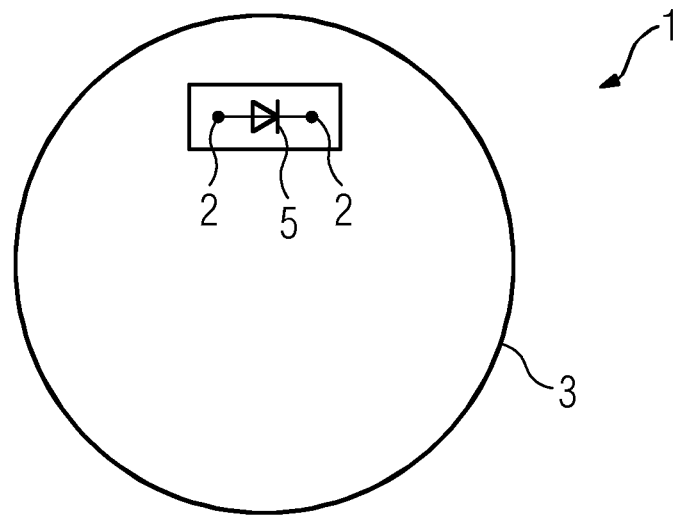
FIG. 5 shows the diode 5 connected on the outside of the housing 3 of the tensioning motor 1.

FIG. 5 shows one possible realization of the rectifier circuit 4 shown in FIG. 3 with only one diode 5. The diode 5 is fastened to the outside of the housing 3 of the tensioning motor 1 between two contacts 2. A pole of the voltage supply can be connected to one contact 2, and the motor 1 can be connected or is connected to the other contact 2. The other pole of the voltage supply is likewise connected to the motor 1.

Figure 6:
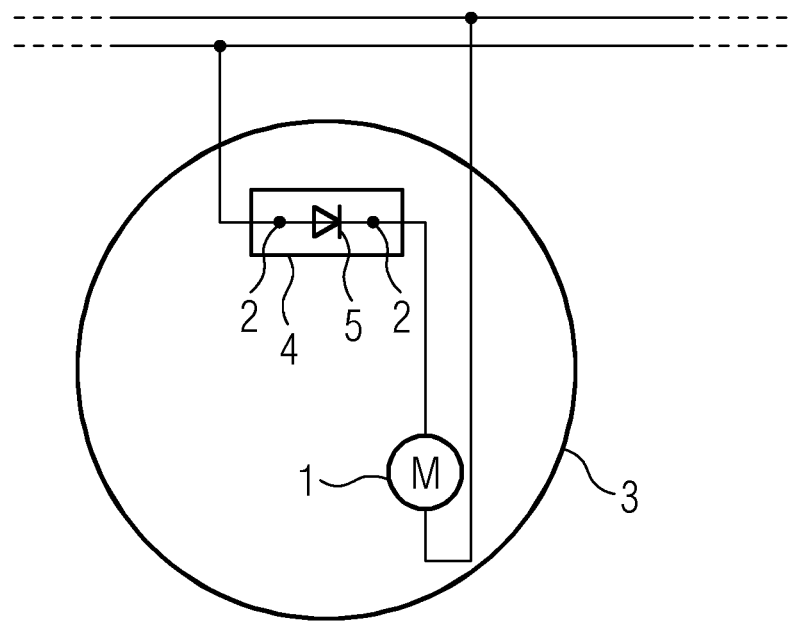
FIG. 6 shows the diode 5 connected on the inside of the housing 3 of the tensioning motor 1.

FIG. 6 shows an electrical interconnection of the diode 5 to the motor 1 in series by means of contacts 2 on the housing 3, as is analogously applicable to FIG. 5. In contrast to FIG. 5, the diode in FIG. 6 is arranged in the housing 3. The housing 3 can simultaneously constitute the external housing of the motor 3 and can be seen in the sectional illustration in FIG. 6 with schematically shown interconnection.

The diode 5 can be arranged outside the housing 3, for example in conjunction with the voltage supply on a printed circuit board. As an alternative, the diode 5 can be arranged between two contacts 2 of the housing 3 on the outside of or inside the housing 3, in particular together with elements of the motor 1. The diode can also be fastened to the housing 3 in such a way that the housing serves as a cooling face for the diode 5. To this end, for example, a cooling face of the diode 5 can be thermally conductively connected to the housing 3, for example by means of conductive adhesive or by metal connections, such as screwing, welding and/or soldering for example.

Figure 7:
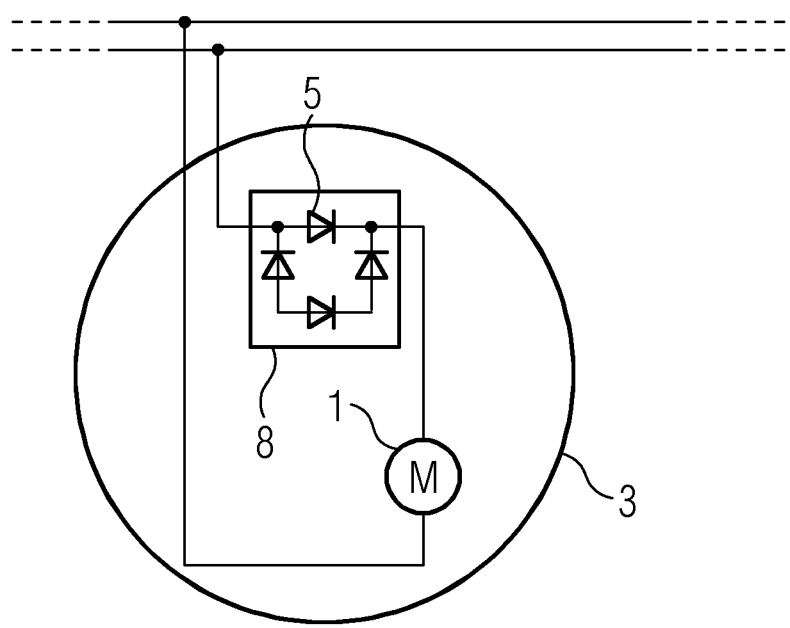
FIG. 7 shows a series circuit 4 according to the invention of a diode 5 realized with a prior-art tensioning motor 1 with a preassembled bridge rectifier circuit 7.

FIG. 7 shows the series circuit 4 according to the invention of the tensioning motor 1 with a diode 5, realized by a tensioning motor 1 from the prior art with a preassembled or preinstalled bridge rectifier circuit 7. In this case, a diode 5, for example by way of the cathode, is connected to one pole of the motor 1, wherein the other pole of the motor 1 is connected to a pole of the voltage source. The other pole of the voltage source is electrically connected, for example, to the anode of the one diode 5. Therefore, the tensioning motor 1 is connected to the one diode 5 in a series circuit 4. The three other diodes of the bridge rectifier circuit 7 are arranged in a parallel branch to the one diode 5, wherein the arrangement of the three diodes in relation to one another prevents current flow across the parallel branch.

Two of the three diodes are electrically connected to one another by way of their anode sides, and the third diode is connected in series with the two diodes by way of the anode side being connected to the cathode side of one of the two other diodes. As a result, irrespective of the polarity of the voltage, at least one of the three diodes is always arranged in the blocking direction in the parallel branch and current flow does not take place across the branch. Therefore, only one diode 5 of the four diodes of the bridge rectifier circuit 7 is used for the rectifier circuit of the spring-loaded drive or the motor 1. Therefore, tensioning motors 1 with a bridge rectifier circuit 7 from the prior art can be used for the rectifier circuit of the spring-loaded drive according to the invention by virtue of connecting only one diode 5 in series with the motor 1 between the voltage source and the motor 1. If required, a changeover can be made by changing the interconnection between the bridge rectifier circuit 7 of the prior art and the rectifier circuit of the spring-loaded drive according to the invention, and vice versa.

The above-described exemplary embodiments can be combined with one another and/or can be combined with the prior art. Therefore, for example, different types of diode can be used, such as semiconductor diodes, rectifier diodes and/or Zener diodes for example. The one diode 5 connected in series with the motor 1 can be electrically connected, by way of the cathode or by way of the anode of the diode 5, to one pole of the motor 1. The direction of rotation of the motor can be determined in this way. Different types of motor can be used, in particular designed for voltage regions of 220 V AC and 110 V DC. A DC voltage motor variant can be used for different spring-loaded drives with different requirements, in particular with a corresponding electromechanical design for a DC voltage supply and an AC voltage supply of double the magnitude. Protection against polarity reversal when wiring the tensioning motor 1 is also realized in this way.

LIST OF REFERENCE SYMBOLS

1 Tensioning motor
2 Contact
3 Housing
4 Series circuit
5 Diode
6 Half-wave of the voltage
7 Bridge rectifier circuit
8 Only one diode of the bridge rectifier circuit is connected up

The invention claimed is:

1. A spring-loaded drive for a high-voltage power switch, the spring-loaded drive comprising:
 at least one spring;
 at least one tensioning motor for said at least one spring; and
 a bridge rectifier being in a form of a Graetz circuit and having a plurality of diodes, wherein only one diode of said plurality of diodes of said bridge rectifier is connected electrically in series with said tensioning motor, in such a way that, in a case of AC voltage, a half-wave of the AC voltage is applied to said tensioning motor by means of said one diode in a forward direction and said tensioning motor can be driven by the half-wave, and wherein, three of said diodes of said bridge rectifier are each connected in series with one another, in parallel with said one diode in series with said tensioning motor, and said three diodes are interconnected in such a way that no current flows across said three diodes.

2. The spring-loaded drive according to claim 1, wherein said one diode is a semiconductor diode.

3. The spring-loaded drive according to claim 1, wherein:
 said tensioning motor has a housing; and
 said one diode is in thermal contact with said housing for cooling said one diode by means of said housing.

4. The spring-loaded drive according to claim 3, wherein said one diode is disposed in said housing and said diode is directly and thermally conductively fastened to said housing.

5. The spring-loaded drive according to claim 1, wherein said one diode is integrated in an electrical circuit of a motor voltage supply.

6. The spring-loaded drive according to claim 1, wherein said one diode is formed from diode elements, connected in series and/or in parallel with one another, with a same forward direction.

7. The spring-loaded drive according to claim 1, wherein said tensioning motor is precisely one tensioning motor for DC voltage and AC voltage and/or a shunt-wound motor.

8. The spring-loaded drive according to claim 3, wherein said housing is a metal housing.

9. A method for operating a spring-loaded drive, which comprises the steps of:
 tensioning at least one spring by at least one tensioning motor for driving a high-voltage power switch; and
 supplying the at least one tensioning motor with a voltage by means of a bridge rectifier being in a form of a Graetz circuit and having a plurality of diodes, wherein only one diode of the plurality of diodes of the bridge rectifier is connected electrically in series with the at least one tensioning motor, in such a way that, in a case of AC voltage, a half-wave of the AC voltage is applied to the at least one tensioning motor by means of the one diode in a forward direction and the at least one tensioning motor can be driven by the half-wave, and wherein, three of the diodes of the bridge rectifier are each connected in series with one another, in parallel with the one diode in series with the at least one tensioning motor, and the three diodes are interconnected in such a way that no current flows across the three diodes.

10. The method according to claim 9, which comprises using precisely one said tensioning motor for the tensioning of the at least one spring, the tensioning motor is operated with DC voltage and AC voltage.

* * * * *